US012801510B2

(12) United States Patent
Ambaljeri et al.

(10) Patent No.: US 12,801,510 B2
(45) Date of Patent: Nov. 17, 2026

(54) AUTOMATED BUILD PROMOTION FOR A SOFTWARE PACKAGE

(71) Applicant: Dell Products L.P., Round Rock, TX (US)

(72) Inventors: Mahantesh M Ambaljeri, Bangalore (IN); Gururaj Kulkarni, Bangalore (IN); Shelesh Chopra, Bangalore (IN); Shashanka UV Navada, Bangalore (IN); Kanagasabapathy Venkatachalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 18/659,594

(22) Filed: May 9, 2024

(65) Prior Publication Data

US 2025/0348410 A1 Nov. 13, 2025

(51) Int. Cl.
*G06F 11/362* (2025.01)
*G06F 8/41* (2018.01)

(52) U.S. Cl.
CPC ............ *G06F 11/3624* (2013.01); *G06F 8/41* (2013.01)

(58) Field of Classification Search
CPC ............... G06F 8/36; G06F 8/48; G06F 11/36
See application file for complete search history.

(56) References Cited

U.S. PATENT DOCUMENTS 10,430,319 B1 * 10/2019 Tokappa ............... G06F 11/368
12,411,757 B1 * 9/2025 Mesde ...................... G06F 8/60
2013/0031542 A1 * 1/2013 Arcilla ................ G06F 9/44505 709/201
2019/0294531 A1 * 9/2019 Avisror ............... G06F 11/3698
2020/0057633 A1 * 2/2020 Topiwala ................ G06F 8/433
2022/0164171 A1 * 5/2022 Johnson .................... G06F 8/77
2024/0338309 A1 * 10/2024 Wilson ...................... G06F 8/65

FOREIGN PATENT DOCUMENTS

EP 4343546 A1 * 3/2024 ......... G06F 9/45558

OTHER PUBLICATIONS

Lianhuan Li et al., “Hybrid Algorithm Based on Content and Collaborative Filtering in Recommendation System Optimization and Simulation”, Hindawi, Scientific Programming, vol. 2021, Article ID 7427409, <https://www.hindawi.com/journals/sp/2021/7427409/>, published on May 19, 2021 (11 pages).

* cited by examiner

*Primary Examiner* — Ziaul A Chowdhury
(74) *Attorney, Agent, or Firm* — Chamberlain, Hrdlicka, White, Williams & Aughtry; Aly Z. Dossa

(57) ABSTRACT

A method for compiling a software package that includes making a first determination that the software package is in a release candidate phase. In addition, the method includes receiving a first build test result history that includes first test results for the first artifact and a second build test result history that includes second test results for the second artifact. Moreover, the method includes identifying, for the first artifact, a first highest test result and, for the second artifact, a second highest test result. In addition, the method includes generating a recommended software package that includes the first artifact version of the first artifact and the second artifact version of the second artifact, compiling the recommended software package to obtain a compiled software package, and sending the compiled software package to the client device.

20 Claims, 6 Drawing Sheets

AUTOMATED BUILD PROMOTION FOR A SOFTWARE PACKAGE

BACKGROUND

Software packages typically include a large number of smaller components packaged together in a process called compiling. During a software development phase, these smaller components are often changed by software developers to complete the building of the overall software package. As such, during development the software package may be compiled many different times with many different combinations of versions of the smaller components, which may make it difficult to test certain aspects of the software package, thereby causing delays or persistence of unwanted defects in the software package.

SUMMARY

In general, embodiments described herein relate to a method for compiling a software package that includes receiving a request to compile the software package from a client device. The method also includes making a first determination that the software package is in a release candidate phase. The method further includes identifying a first artifact and a second artifact associated with the software package. Moreover, the method includes associating a threshold value with the first artifact and the second artifact based on the first determination. In addition, the method includes receiving, for the first artifact, a first build test result history that includes first test results for the first artifact and first separate versions of the first artifact, and where each of the first test results is associated with a separate one of the first separate versions of the first artifact. Also, the method includes receiving, for the second artifact, a second build test result history that includes second test results for the second artifact and second separate versions of the second artifact, and where each of the second test results is associated with a separate one of the second separate versions of the second artifact. Further, the method includes making a second determination that at least one first test result from the first test results is above the threshold value and making a third determination that at least one second test result from the second test results is above the threshold value. Moreover, the method includes identifying, for the first artifact, a first highest test result of the first test results and a first artifact version associated with the first highest test result and identifying, for the second artifact, a second highest test result of the second test results and a second artifact version associated with the second highest test result. In addition, the method includes generating a recommended software package that includes the first artifact version of the first artifact and the second artifact version of the second artifact, compiling the recommended software package to obtain a compiled software package, and sending the compiled software package to the client device.

In general, embodiments described herein relate to a method for compiling a software package that includes receiving a request to compile the software package from a client device. The method further includes identifying a first artifact and a second artifact associated with the software package. In addition, the method includes receiving, for the first artifact, a first build test result history that includes first test results for the first artifact and first separate versions of the first artifact, and where each of the first test results is associated with a separate one of the first separate versions of the first artifact. Also, the method includes receiving, for the second artifact, a second build test result history that includes second test results for the second artifact and second separate versions of the second artifact, and where each of the second test results is associated with a separate one of the second separate versions of the second artifact. Moreover, the method includes identifying, for the first artifact, a first highest test result of the first test results and a first artifact version associated with the first highest test result and identifying, for the second artifact, a second highest test result of the second test results and a second artifact version associated with the second highest test result. In addition, the method includes generating a recommended software package that includes the first artifact version of the first artifact and the second artifact version of the second artifact, compiling the recommended software package to obtain a compiled software package, and sending the compiled software package to the client device.

In general, embodiments described herein relate to a non-transitory computer readable medium including computer readable program code, which when executed by a computer processor enables the computer processor to perform a method for compiling a software package that includes receiving a request to compile the software package from a client device. The method further includes identifying a first artifact and a second artifact associated with the software package. In addition, the method includes receiving, for the first artifact, a first build test result history that includes first test results for the first artifact and first separate versions of the first artifact, and where each of the first test results is associated with a separate one of the first separate versions of the first artifact. Also, the method includes receiving, for the second artifact, a second build test result history that includes second test results for the second artifact and second separate versions of the second artifact, and where each of the second test results is associated with a separate one of the second separate versions of the second artifact. Moreover, the method includes identifying, for the first artifact, a first highest test result of the first test results and a first artifact version associated with the first highest test result and identifying, for the second artifact, a second highest test result of the second test results and a second artifact version associated with the second highest test result. In addition, the method includes generating a recommended software package that includes the first artifact version of the first artifact and the second artifact version of the second artifact, compiling the recommended software package to obtain a compiled software package, and sending the compiled software package to the client device.

BRIEF DESCRIPTION OF DRAWINGS

Certain embodiments will be described with reference to the accompanying drawings. However, the accompanying drawings illustrate only certain aspects or implementations by way of example and are not meant to limit the scope of the claims.

Specific embodiments will now be described with reference to the accompanying figures.

DETAILED DESCRIPTION

Figure 1:
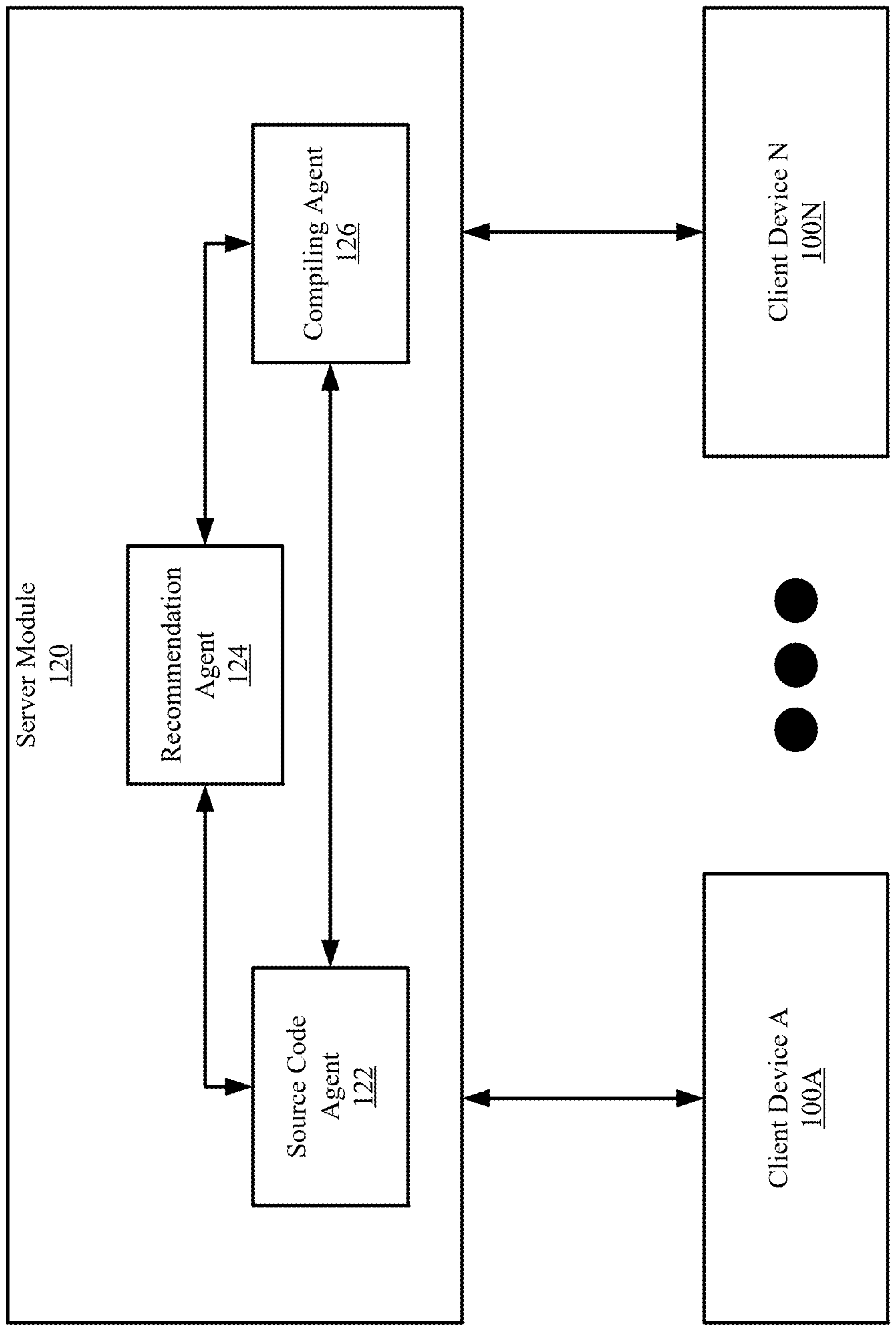
FIG. 1 shows a diagram of a system in accordance with one or more embodiments.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

A software package typically includes a large number of smaller packages of software compiled together. These smaller packages may include individual binaries, executables, libraries, or groups of any of the foregoing. Each of these smaller pieces of software may be referred to as an artifact. When developing a software package, the software package may be compiled many times for testing various aspects of the software package. In addition, one or more of these artifacts may also continue to be updated while developing the larger software package, thereby creating different versions for each artifact. As such, many different versions of the software package may be compiled and subject to various testing during the development of the software package. However, there is currently no way to define, in the compiling process, a particular version of each artifact that should be chosen. This limitation can lead to a less robust, reliable, and stable version of the software package.

As such, there exists a desire for making an automatic selection of artifact versions based on test results and/or user ratings of the artifacts. Such an automatic selection tool may be used to identify certain versions of each artifact to include in the software package based on different criteria and/or stages of the software development cycle. Further, such an automatic selection tool may be used to improve the robustness, reliability, and/or stability of the software package and may further be used to aid in isolating defects in the software package and explaining the cause of the test results for the software package.

The following describes one or more embodiments.

FIG. 1 shows a diagram of a system in accordance with one or more embodiments described herein. The system may include any number of client device(s) (e.g., 100A-100N) and any number of server module(s) (120). In one or more embodiments, the server module (120) includes a source code agent (122), a recommendation agent (124), and a compiling agent (126). Each of these components is described below.

In one or more embodiments, the server module (120) is one or more data centers that are each configured for hosting and maintaining various workloads (such as the source code agent (122), the recommendation agent (124), and/or the compiling agent (126)), and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, a data center of an organization may exchange data with other data centers of the same organization registered in/to the network in order to, for example, participate in a collaborative workload placement, which may be accomplished by migrating applications from one data center to another. One of ordinary skill will appreciate that a data center may perform other functionalities without departing from the scope of the invention.

In one or more embodiments, the client device(s) (e.g., 100A-100N) may be computing devices. Such computing devices may be referred to as endpoints. In one or more embodiments, an endpoint is any computing device, collection of computing devices, portion of one or more computing devices, or any other logical grouping of computing resources. In one or more embodiments, the client device(s) (e.g., 100A-100N) may collectively be referred to as a client environment.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention. In one or more embodiments, a set of computing devices may form all or a portion of a data domain, all, or part of which may require migrating from time to time (e.g., upon request and/or pursuant to a defined schedule). In one or more embodiments, a data domain is any set of computing devices for which data migration operations are performed.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a computing device includes and/or is operatively connected to any number of storage volumes (not shown). In one or more embodiments, a volume is a logically accessible storage element of a computing system. A volume may be part of one or more disk drives, and may or may not include any number of partitions. In one or more embodiments, a volume stores information relevant to the operation and/or accessible data of a computing device. In one or more embodiments, a volume may be all or part of any type of computing device storage (described above).

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the client device(s) (e.g., 100A-100N) may be utilized to receive inputs from users to develop software, such as a software package and/or artifacts. The software package and/or artifacts may be stored locally on the client device(s) (e.g., 100A-100N), in the server module (120) or a combination thereof. Further, the source code developed by the users may be stored in a source code management system, which may be stored locally on the client device(s) (e.g., 100A-100N), in the server module (120) or a combination thereof.

In one or more embodiments, the system also includes the source code agent (122). In one or more embodiments, the source code agent (122) is operatively connected to one or more of the client device(s) (e.g., 100A-100N) and/or the server module (120). In one or more embodiments, the source code agent (122) may be implemented as a logical device. The logical device may utilize the computing resources of any number of computing devices to provide the functionality of the data center described throughout this application.

In one or more embodiments, the system also includes the recommendation agent (124). In one or more embodiments, the recommendation agent (124) is operatively connected to one or more of the client device(s) (e.g., 100A-100N) and/or the server module (120). In one or more embodiments, the recommendation agent (124) may operate locally on one or more of the client device(s) (e.g., 100A-100N) and/or the server module (120). In one or more embodiments, the recommendation agent (124) may be implemented as a logical device. The logical device may utilize the computing resources of any number of computing devices to provide the functionality of the data center described throughout this application.

In one or more embodiments, the system also includes the compiling agent (126). In one or more embodiments, the compiling agent (126) is operatively connected to one or more of the client device(s) (e.g., 100A-100N) and/or the server module (120). In one or more embodiments, the compiling agent (126) may be implemented as a logical device. The logical device may utilize the computing resources of any number of computing devices to provide the functionality of the data center described throughout this application.

In one or more embodiments, the client device(s) (e.g., 100A-100N) and the server module (120) are operatively connected via a network (not shown). In one or more embodiments, the network may represent a computing network configured for computing resource and/or messages exchange among registered computing hosts (e.g., the client device(s) (e.g., 100A-100N), the server module (120), etc.). As discussed above, components of the system may operatively connect to one another through the network (e.g., a LAN, a WAN, a mobile network, a wireless LAN (WLAN), etc.). In one or more embodiments, the network may be implemented using any combination of wired and/or wireless network topologies, and the network may be operably connected to the Internet or other networks. Further, the network may enable interactions between the client device (s) (e.g., 100A-100N) and the server module (120) through any number and types of wired and/or wireless network protocols (e.g., TCP, UDP, Internet Protocol version 4 (IPv4), etc.).

In one or more embodiments, the source code agent (122) may be utilized to access and/or otherwise manipulate source code for one or more artifacts and/or software packages. In one or more embodiments, the recommendation agent (124) may analyze the artifacts and/or software packages and provide a recommended combination of artifacts and/or software packages as described in further detail below. In one or more embodiments, the compiling agent (126) compiles the source code of the artifacts and/or software packages, links the relevant files, functions, subroutines, and/or libraries, loads all of the preceding into a functional binary and/or executable, runs automated unit tests, and/or stores the compiled software package in a designated storage location.

While FIG. 1 shows a configuration of components, other configurations may be used without departing from the scope of embodiments described herein. Accordingly, embodiments disclosed herein should not be limited to the configuration of components shown in FIG. 1.

Figure 2:
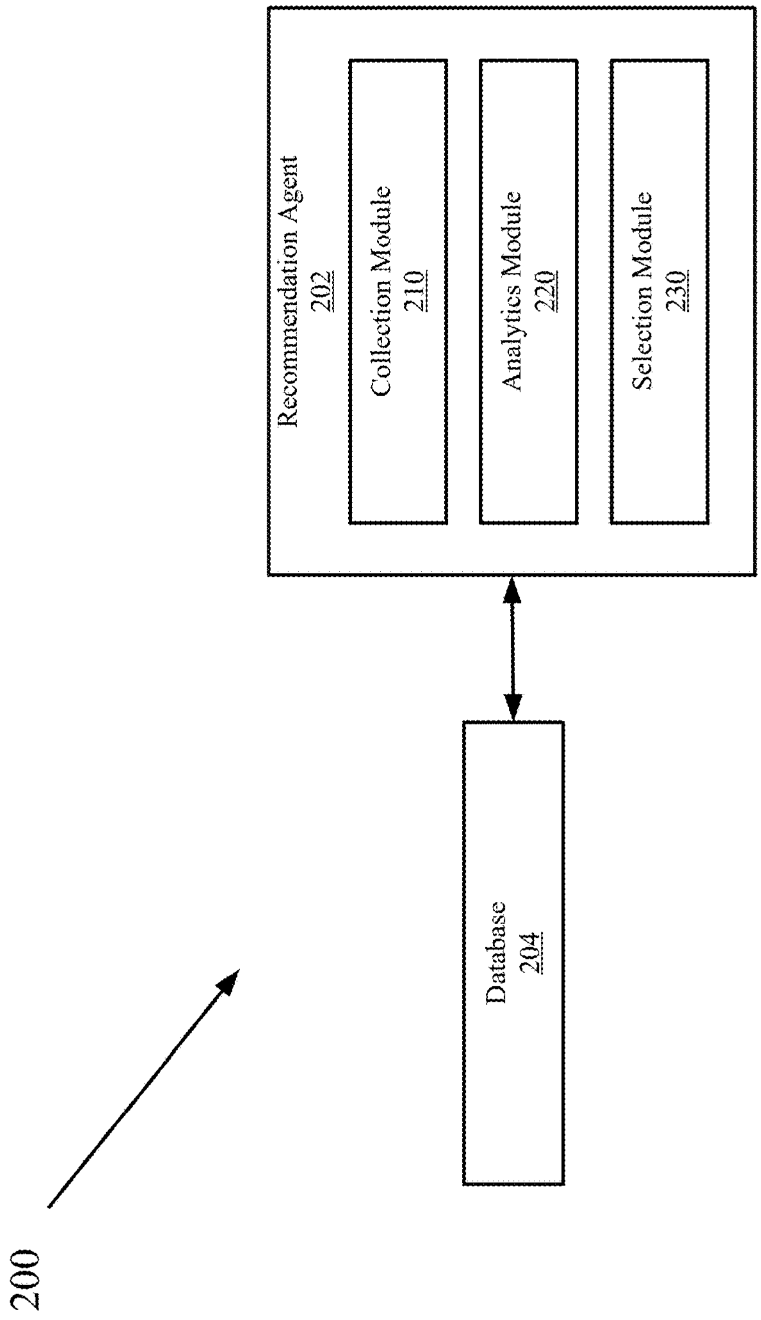
FIG. 2 shows a diagram of a recommendation agent in accordance with one or more embodiments.

FIG. 2 shows a diagram of a recommendation system (200) in accordance with one or more embodiments. The recommendation system (200) includes a recommendation agent (202) that includes a collection module (210), an analytics module (220), and a selection module (230) and a database (204). The recommendation system (200) may include additional, fewer, and/or different components without departing from the scope disclosed herein. Each component illustrated in FIG. 2 is discussed below.

In one or more embodiments, the collection module (210) includes functionality to collect compilation information such as: software development phases, user criteria, artifact listings and version histories, user roles, test results and/or user ratings. In one or more embodiments, the compilation information is obtained from the source code agent, and/or user inputs from a client device. In one or more embodiments, the software development phase includes a release candidate phase, a feature complete phase, or a continuous development phase. The release candidate phase is a phase of development close to release to the consumer of the software in which code churn, which is a measure of how much the code changes from one version to the next, is minimal and only minor changes to fix errors, such as bugs, are expected. The feature complete phase is a middle phase of software development in which all of the features of the overall software package have been decided and each of the features may be worked on separately. The continuous development phase is an early phase of software development in which many aspects of the software are still being developed and many errors are expected.

In one or more embodiments, the user criteria can include a number of different user inputs such as a minimum version number for one or more artifacts, minimum test scores for one or more of the various tests that may be performed on the artifacts, which are described in greater detail below, acceptable types of failures, and/or unacceptable types of failures. In one or more embodiments, the listing of artifacts includes a list of possible artifacts that may be included in software packages, a list of artifacts associated with each software package, a list of dependencies between artifacts, and/or a list artifacts included in each group of artifacts. In one or more embodiments, the version histories of artifacts includes a list of the available versions for each artifact and may be limited to a maximum number of available versions and/or a maximum age of versions. In one or more embodiments, the user roles includes a user's responsibility associated with a software package and may include a list of features or other aspects of the software package the user is working on or associated with. In one or more embodiments, the test results includes the results of testing performed on one or more of the artifacts and may be from automated testing such as security tests, code churn tests, defect tests, feature tests, or any other testing relating to the quality of the software package. In one or more embodiments, the user ratings includes a user's rating of one or more aspects of each artifact and/or each version of each artifact.

In one or more embodiments, the analytics module (220) analyzes the collected compilation information and a request to compile a particular software package to determine a promotion score for each version of each artifact included within the particular software package. In one or more embodiments, the analytics module (220) a content-based filter and/or a collaborative filter on the collected compilation information. In one or more embodiments, the content-based filter utilizes user ratings of artifacts and the presence of the artifacts in the software package to determine a promotion score. In one or more embodiments, the content-based filter uses machine learning techniques such as Bayesian classifiers, cluster analysis, decision trees, and/or artificial neural networks. In one or more embodiments, the collaborative filter clusters the collected compilation information between failures and passes for one or more tests to associate certain information with failures and other information with passes. In one or more embodiments, the collaborative filter uses a clustering technique such as K-means clustering. In one or more embodiments, the analytics module (220) utilizes a hybrid approach that combines the collaborative filter and the content filter. More details regarding how the analytics module (220) analyzes collected compilation information are provided in FIGS. 4 and 5 below.

In one or more embodiments, the selection module (230) analyzes the collected compilation information, a request to compile a particular software package, and/or the promotion scores determined by the analytics module (220) to determine the recommended versions of each artifact included within the particular software package. More details regarding how the selection module (230) selects versions of artifacts are provided in FIGS. 3-5 below In one or more embodiments, the database (204) stores all data collected by the collection module (210), the promotion scores determined by the analytics module (220), the recommended versions determined by the selection module (230) and/or any instructions used by any of the modules of the recommendation agent (204). As used herein, "storage" refers to a hardware component that is used to store data. Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

Figure 3:
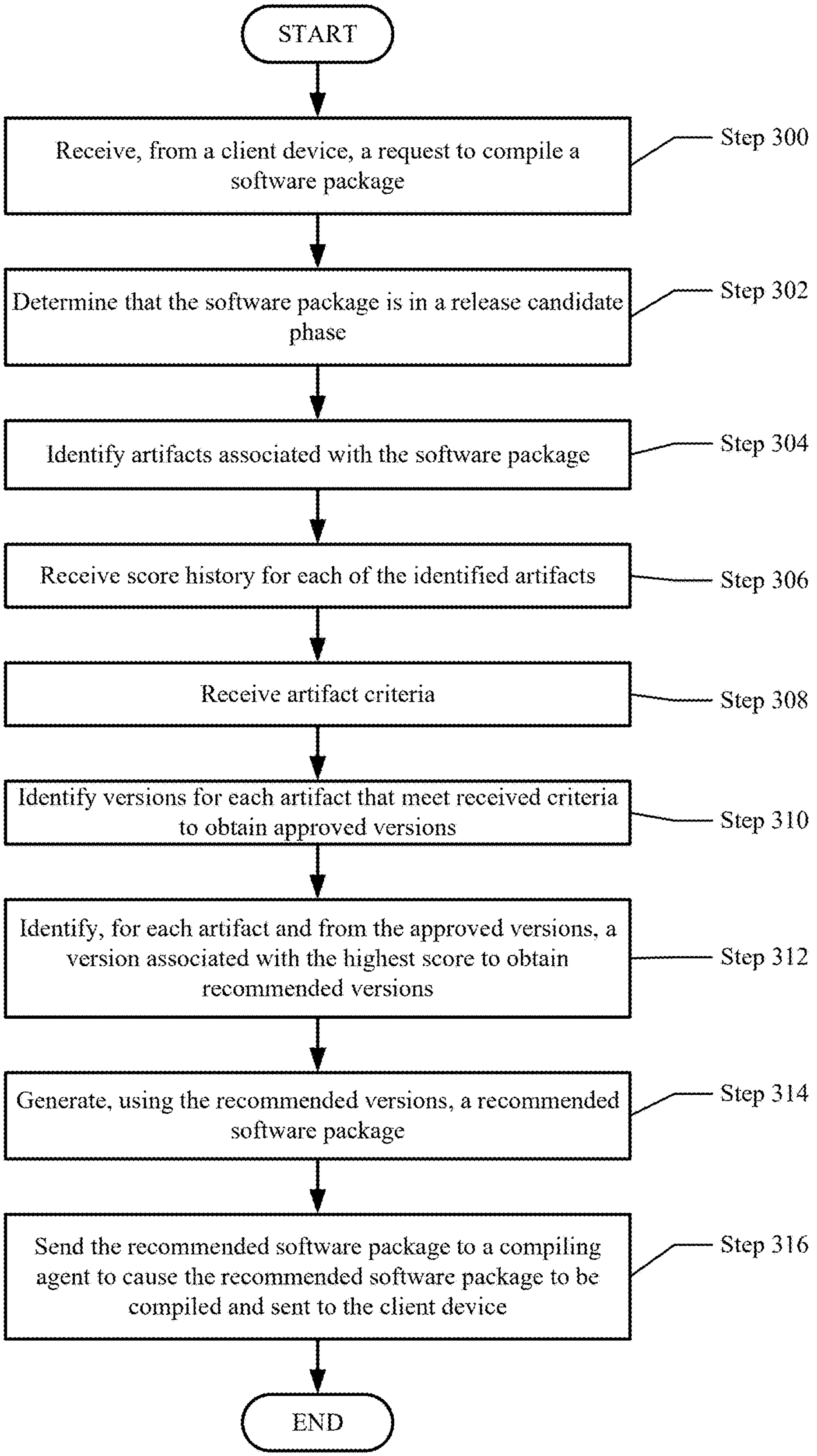
FIG. 3 shows a flowchart of a method for automatically promoting a build of a software package accordance with one or more embodiments.
Figure 4:
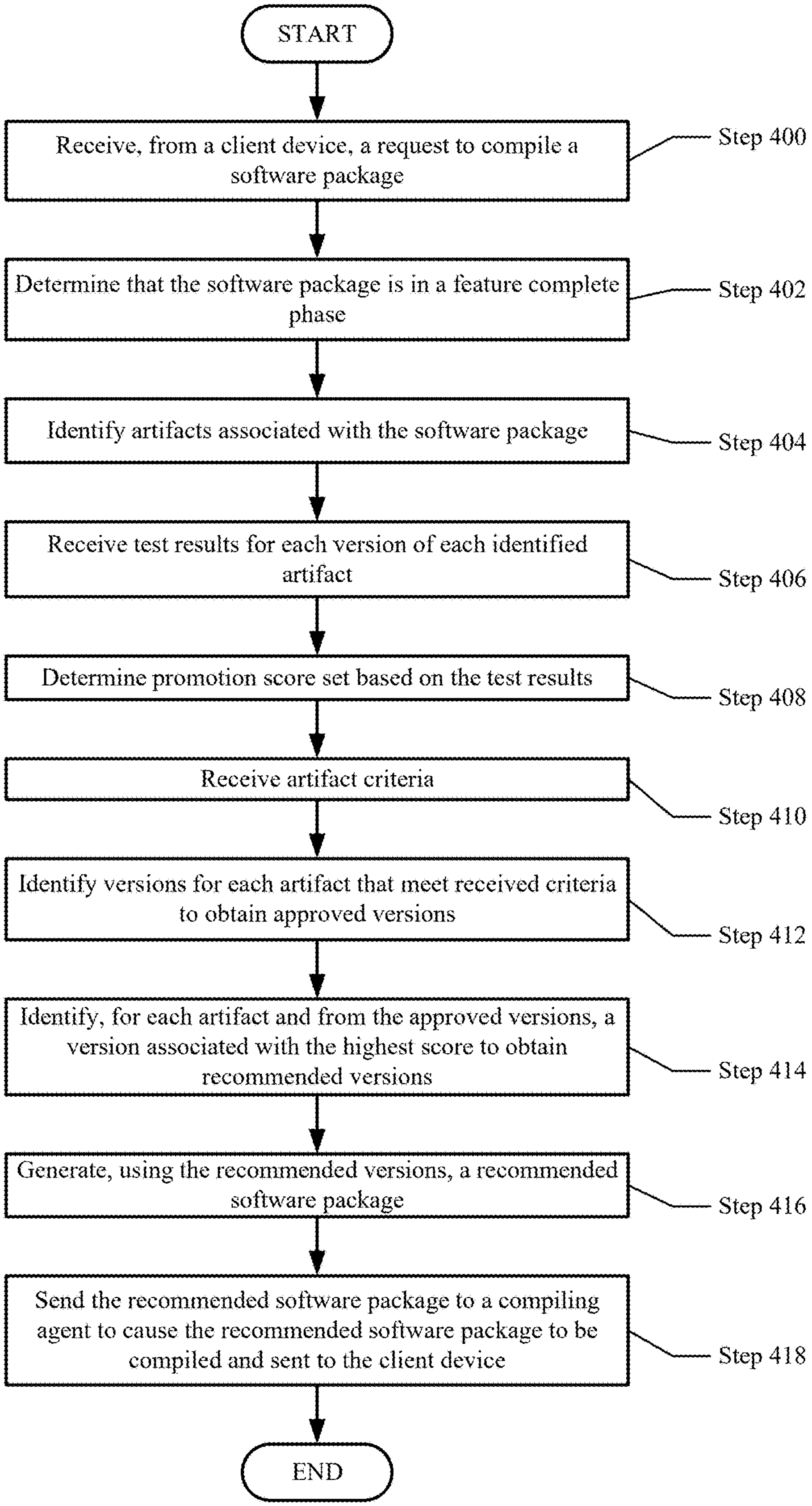
FIG. 4 shows a flowchart of a method for automatically promoting a build of a software package accordance with one or more embodiments.
Figure 5:
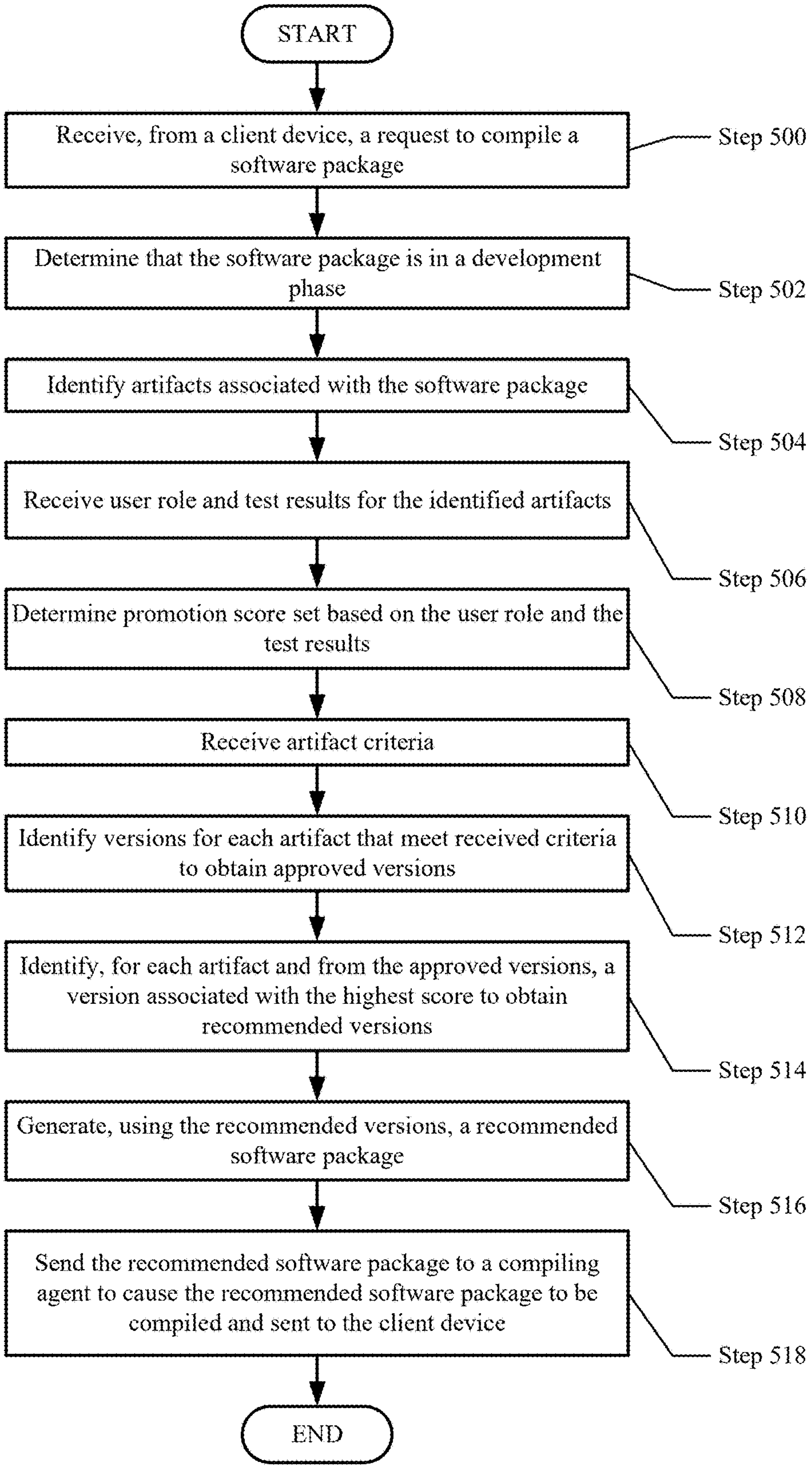
FIG. 5 shows a flowchart of a method for automatically promoting a build of a software package accordance with one or more embodiments.

FIGS. 3-5 show methods for enhancing stability and quality of a software package. The basic steps for compiling a software package include artifacts from a source code management system and compiling the latest versions of each artifact using a compiling tool. The compiling process may include checking for dependencies, linking the relevant artifacts, loading the artifacts into functional binaries and/or executables, running automated tests on the compiled software package, and storing the software package in a location accessible by the end user. When developing software, one or more of the artifacts may change many times and the compatibility of the artifacts may also change. As such, there exists a desire to dynamically select the versions of the artifacts to create more robust, reliable, and less defective software packages. FIGS. 3-5 show methods for dynamically reviewing and selecting versions of artifacts to include in the final compiled software package. In particular, the compilation information described above is used to determine which versions are most appropriate to select to improve the reliability, security, robustness, and/or quality of the compiled software package.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3, the method shown in FIG. 3 may be executed by, for example, the recommendation system (e.g., 200, FIG. 2) discussed above. Other components of the server module (e.g., 120, FIG. 1) illustrated in FIG. 1 may also execute all or part of the method shown in FIG. 3 without departing from the scope disclosed herein.

In Step 300, the recommendation agent receives, from a client device, a request to compile a software package. In one or more embodiments, the request is received from a user providing inputs to the client device and may be received from the client device via another agent within the server module, such as the source code agent (e.g., 122, FIG. 1) or the compiling agent (e.g., 126).

In Step 302, the recommendation agent determines that the software package is in a release candidate phase. The recommendation agent may make this determination based on a user input, an identifier or other indication in the request received in Step 300, and/or based on information received in Steps 306 and/or 308 below.

In Step 304, the recommendation agent identifies one or more artifacts that are associated with the software package. In one or more embodiments, the request received in Step 300 also includes a listing of associated artifacts. In one or more embodiments, each artifact includes a single artifact or a grouping of multiple artifacts. For example, a first identified artifact is an individual artifact, a second identified artifact is a package of multiple individual artifacts, a third artifact also is an individual artifact, and a fourth artifact also is a package of multiple individual artifacts.

In Step 306, the recommendation agent receives a score history for each of the identified artifacts. In one or more embodiments, the recommendation agent sends a request to another agent, such as the compiling agent, to request score histories for each of the artifacts identified in Step 304 and then receives the response in this Step 306. In one or more embodiments, the recommendation agent periodically requests score histories for different artifacts and stores the score histories in a database (e.g., 204, FIG. 2) and then retrieves the score histories from the database in response to the identifying in Step 304. In one or more embodiments, the recommendation agent receives the score histories with the request received in Step 300. In one or more embodiments, the recommendation agent performs its own scoring of the artifacts. In one or more embodiments, the score history for each identified artifact is a build test result history that includes a build test result for each version of each artifact identified in Step 304. In one or more embodiments, the build test results are based on tests that test various aspects of the artifacts and may include a security test, a code churn test, a defect test, a feature test, and/or a user rating. In one or more embodiments, the build tests include automated tests and/or ratings from users. In one or more embodiments, the recommendation agent receives multiple build test results for each version and performs an additional step of consolidating the multiple build test results into a single number through any normalization process. In one or more embodiments, the build test results may be input into an analytics module (e.g., 220, FIG. 2) and passed through a collaborative filter to output a single score for each version of each artifact. In one or more embodiments, the output of the filter also includes an explanation detailing how much each of the build test results affected the single score for each version of each artifact.

In Step 308, the recommendation agent receives artifact criteria. In one or more embodiments, various criteria may be established to automatically reduce the number of versions of artifacts from which the recommendation agent may choose. In one or more embodiments, the artifact criteria are input by a user. In one or more embodiments, the artifact criteria are predetermined based on the determination in Step 302. In one or more embodiments, the artifact criteria may establish certain threshold values such as a minimum build test result score, a maximum artifact age, and/or a minimum version number for an artifact. For example, a minimum build test score of 95 out of 100 may be set to eliminate versions of artifacts with a build test score below 95. In another example, a threshold of only considering the five most recent versions of each artifact to eliminate the consideration of older versions.

In Step 310, the recommendation agent identifies versions for each artifact that meets the artifact criteria received in Step 308 to obtain an approved versions list. In one or more embodiments, the recommendation agent compares each version with the artifact criteria and eliminates any versions that do not meet the artifact criteria.

In Step 312, the recommendation agent identifies, for each artifact and from the approved versions list, a version associated with the highest build test result to obtain a list of recommended versions. For example, for a first artifact the recommendation agent identifies a version of the first artifact that has the highest build test result out of all the first artifact versions that are approved. Further, this identified version may or may not be the most recent version of the first artifact.

In Step 314, the recommendation agent generates a recommended software package using the recommended versions identified in Step 312. In one or more embodiments, the recommended software package includes all of the same artifacts as the requested software package received in Step 300, but the versions of each of the artifacts may not all be the most recent versions that are available.

In Step 316, the recommendation agent sends the recommended software package to a compiling agent to cause the recommended software package to be compiled and sent to the client device to enable the user to use the compiled software package. In one or more embodiments, the compiling agent utilizes any known compiling method to compile the recommended software package into a form usable by a user.

The method may end following Step 316.

Turning now to FIG. 4, the method shown in FIG. 4 may be executed by, for example, the recommendation system (e.g., 200, FIG. 2) discussed above. Other components of the server module (e.g., 120, FIG. 1) illustrated in FIG. 1 may also execute all or part of the method shown in FIG. 4 without departing from the scope disclosed herein.

In Step 400, the recommendation agent receives, from a client device, a request to compile a software package. In one or more embodiments, the request is received from a user providing inputs to the client device and may be received from the client device via another agent within the server module, such as the source code agent (e.g., 122, FIG. 1) or the compiling agent (e.g., 126).

In Step 402, the recommendation agent determines that the software package is in a feature complete phase. The recommendation agent may make this determination based on a user input, an identifier or other indication in the request received in Step 400, and/or based on information received in Steps 406 and/or 410 below.

In Step 404, the recommendation agent identifies one or more artifacts that are associated with the software package. In one or more embodiments, the request received in Step 400 also includes a listing of associated artifacts. In one or more embodiments, each artifact includes a single artifact or a grouping of multiple artifacts. For example, a first identified artifact is an individual artifact, a second identified artifact is a package of multiple individual artifacts, a third artifact also is an individual artifact, and a fourth artifact also is a package of multiple individual artifacts.

In Step 406, the recommendation agent receives test results for each of the identified artifacts. In one or more embodiments, the recommendation agent sends a request to another agent, such as the compiling agent, to request test results for each of the artifacts identified in Step 404 and then receives the response in this Step 406. In one or more embodiments, the recommendation agent periodically requests test results for different artifacts and stores the test results in a database (e.g., 204, FIG. 2). In this embodiment, the recommendation agent then retrieves the test results from the database in response to the identifying in Step 404. In one or more embodiments, the recommendation agent receives the test results with the request received in Step 400. In one or more embodiments, the recommendation agent performs its own testing of the artifacts. In one or more embodiments, the test results for each identified artifact is a build test result history that includes a build test result for each version of each artifact identified in Step 404. In one or more embodiments, the build test results are based on tests that test various aspects of the artifacts and may include a security test, a code churn test, a defect test, a feature test, and/or a user rating. In one or more embodiments, the build tests include automated tests and/or ratings from users.

In Step 408, the recommendation agent determines a promotion score set based on the test results received in Step 406. In one or more embodiments, the build test results may be input into an analytics module (e.g., 220, FIG. 2) and passed through a content-based filter to output a single score for each version of each artifact. In one or more embodiments, the output of the filter also includes an explanation detailing how much each of the build test results affected the single score for each version of each artifact. In one or more embodiments, the recommendation agent selects a content-based filter based on the determination in Step 402. In one or more embodiments, the content-based filter utilizes a code churn test result and a defect test results for each version. In one or more embodiments, if a negative result from a defect test is identified (i.e., indicated that there is a defect in the artifact), the recommendation agent determines whether the defect is a result of code churn of features. If the defect is a result of code churn of features to be completed, then the version is rejected (i.e., is assigned a lower promotion score) and an indicator, such as a message, may be included with the rejection of the version. If the defect is not a result of code churn of features to be completed, then the version is passed (i.e., is assigned a higher promotion score).

In Step 410, the recommendation agent receives artifact criteria. In one or more embodiments, various criteria may be established to automatically reduce the number of versions of artifacts from which the recommendation agent may choose. In one or more embodiments, the artifact criteria are input by a user. In one or more embodiments, the artifact criteria are predetermined based on the determination in Step 402. In one or more embodiments, the artifact criteria may establish certain threshold values such as a minimum build test result score, a maximum artifact age, and/or a minimum version number for an artifact. For example, a minimum build test score of 85 out of 100 may be set to eliminate versions of artifacts with a build test score below 85. In another example, a threshold of only considering the five most recent versions of each artifact to eliminate the consideration of older versions.

In Step 412, the recommendation agent identifies versions for each artifact that meets the artifact criteria received in Step 410 to obtain an approved versions list. In one or more embodiments, the recommendation agent compares each version with the artifact criteria and eliminates any versions that do not meet the artifact criteria.

In Step 414, the recommendation agent identifies, for each artifact and from the approved versions list, a version associated with the highest build test result to obtain a list of recommended versions. For example, for a first artifact the recommendation agent identifies a version of the first artifact that has the highest build test result out of all the first artifact versions that are approved. Further, this identified version may or may not be the most recent version of the first artifact.

In Step 416, the recommendation agent generates a recommended software package using the recommended versions identified in Step 414. In one or more embodiments, the recommended software package includes all of the same artifacts as the requested software package received in Step 400, but the versions of each of the artifacts may not all be the most recent versions that are available.

In Step 418, the recommendation agent sends the recommended software package to a compiling agent to cause the recommended software package to be compiled and sent to the client device to enable the user to use the compiled software package. In one or more embodiments, the compiling agent utilizes any known compiling method to compile the recommended software package into a form usable by a user.

The method may end following Step 418.

Turning now to FIG. 5, the method shown in FIG. 5 may be executed by, for example, the recommendation system (e.g., 200, FIG. 2) discussed above. Other components of the server module (e.g., 120, FIG. 1) illustrated in FIG. 1 may also execute all or part of the method shown in FIG. 5 without departing from the scope disclosed herein.

In Step 500, the recommendation agent receives, from a client device, a request to compile a software package. In one or more embodiments, the request is received from a user providing inputs to the client device and may be received from the client device via another agent within the server module, such as the source code agent (e.g., 122, FIG. 1) or the compiling agent (e.g., 126).

In Step 502, the recommendation agent determines that the software package is in a development phase. The recommendation agent may make this determination based on a user input, an identifier or other indication in the request received in Step 500, and/or based on information received in Steps 506 and/or 510 below.

In Step 504, the recommendation agent identifies one or more artifacts that are associated with the software package. In one or more embodiments, the request received in Step 500 also includes a listing of associated artifacts. In one or more embodiments, each artifact includes a single artifact or a grouping of multiple artifacts. For example, a first identified artifact is an individual artifact, a second identified artifact is a package of multiple individual artifacts, a third artifact also is an individual artifact, and a fourth artifact also is a package of multiple individual artifacts.

In Step 506, the recommendation agent receives a user role and test results for each of the identified artifacts. In one or more embodiments, the user role is based on a user associated with the request received in Step 500. In one or more embodiments, the user role relates to intended users of the compiled software package. In one or more embodiments, the recommendation agent sends a request to another agent, such as the compiling agent, to request test results for each of the artifacts identified in Step 504 and then receives the response in this Step 506. In one or more embodiments, the recommendation agent periodically requests test results for different artifacts and stores the test results in a database (e.g., 204, FIG. 2). In this embodiment, the recommendation agent then retrieves the test results from the database in response to the identifying in Step 504. In one or more embodiments, the recommendation agent receives the test results with the request received in Step 500. In one or more embodiments, the recommendation agent performs its own testing of the artifacts. In one or more embodiments, the test results for each identified artifact is a build test result history that includes a build test result for each version of each artifact identified in Step 504. In one or more embodiments, the build test results are based on tests that test various aspects of the artifacts and may include a security test, a code churn test, a defect test, a feature test, and/or a user rating. In one or more embodiments, the build tests include automated tests and/or ratings from users.

In Step 508, the recommendation agent determines a promotion score set based on the test results received in Step 506. In one or more embodiments, the build test results may be input into an analytics module (e.g., 220, FIG. 2) and passed through a hybrid-based filter to output a single score for each version of each artifact. In one or more embodiments, the output of the filter also includes an explanation detailing how much each of the build test results affected the single score for each version of each artifact. In one or more embodiments, the recommendation agent selects a hybrid-based filter based on the determination in Step 502. In one or more embodiments, the hybrid-based filter utilizes a code churn test result, a defect test result, and a security test result for each version. In one or more embodiments, the recommendation agent determines whether the user role would be affected by any negative (i.e., below a threshold value) test results. If the user role would be affected by any of the negative test results, then the version is rejected (i.e., is assigned a lower promotion score) and an indicator, such as a message, may be included with the rejection of the version. If the user role would not be affected by any of the negative test results, then the version is passed (i.e., is assigned a higher promotion score).

In Step 510, the recommendation agent receives artifact criteria. In one or more embodiments, various criteria may be established to automatically reduce the number of versions of artifacts from which the recommendation agent may choose. In one or more embodiments, the artifact criteria are input by a user. In one or more embodiments, the artifact criteria are predetermined based on the determination in Step 502. In one or more embodiments, the artifact criteria may establish certain threshold values such as a minimum build test result score, a maximum artifact age, and/or a minimum version number for an artifact. For example, a minimum build test score of 75 out of 100 may be set to eliminate versions of artifacts with a build test score below 75. In another example, a threshold of only considering the five most recent versions of each artifact to eliminate the consideration of older versions.

In Step 512, the recommendation agent identifies versions for each artifact that meets the artifact criteria received in Step 510 to obtain an approved versions list. In one or more embodiments, the recommendation agent compares each version with the artifact criteria and eliminates any versions that do not meet the artifact criteria.

In Step 514, the recommendation agent identifies, for each artifact and from the approved versions list, a version associated with the highest build test result to obtain a list of recommended versions. For example, for a first artifact the recommendation agent identifies a version of the first artifact that has the highest build test result out of all the first artifact versions that are approved. Further, this identified version may or may not be the most recent version of the first artifact.

In Step 516, the recommendation agent generates a recommended software package using the recommended versions identified in Step 514. In one or more embodiments, the recommended software package includes all of the same artifacts as the requested software package received in Step 500, but the versions of each of the artifacts may not all be the most recent versions that are available.

In Step 518, the recommendation agent sends the recommended software package to a compiling agent to cause the recommended software package to be compiled and sent to the client device to enable the user to use the compiled software package. In one or more embodiments, the compiling agent utilizes any known compiling method to compile the recommended software package into a form usable by a user.

The method may end following Step 518.

Figure 6:
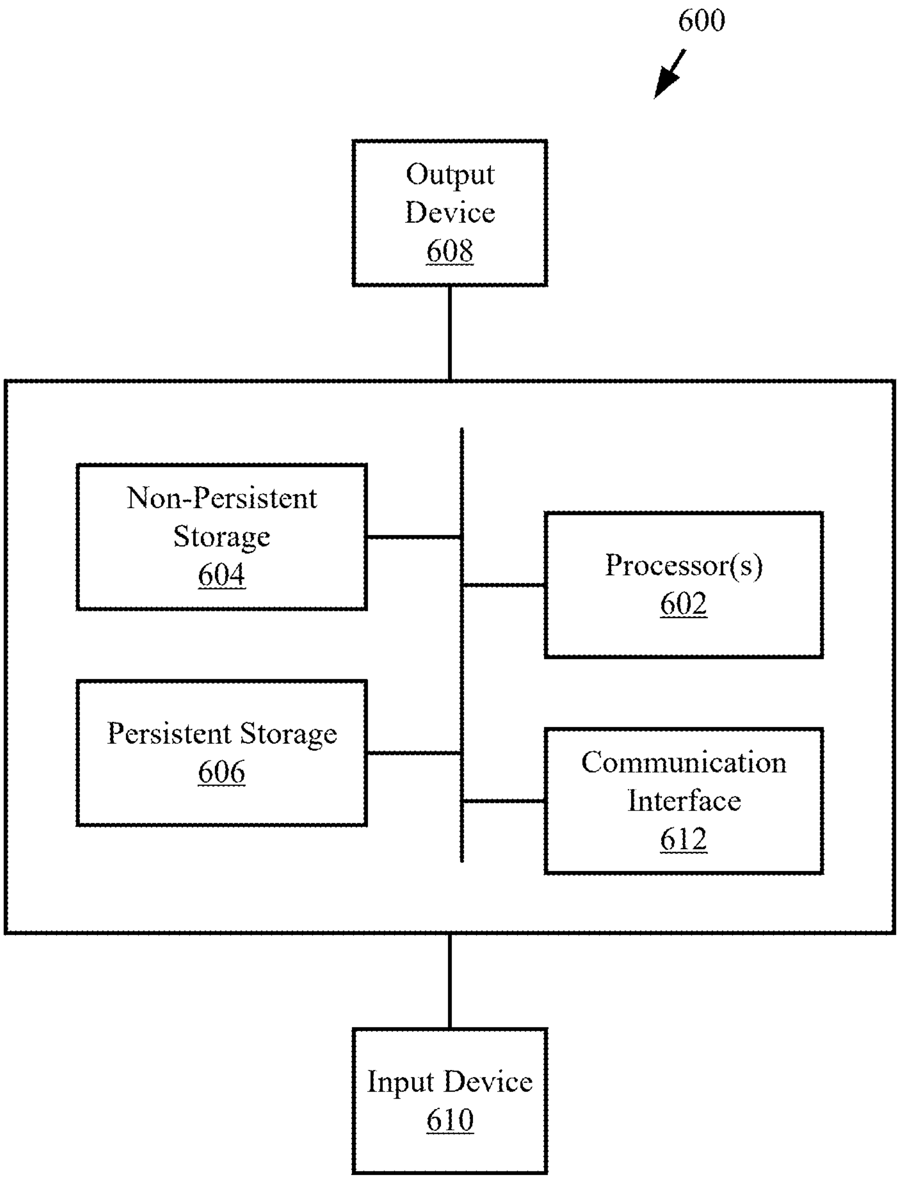
FIG. 6 shows a diagram of a computing system in accordance with one or more embodiments.

Turning to FIG. 6, FIG. 6 shows a diagram of a computing system in accordance with one or more embodiments.

In one or more embodiments, the computing device (600) may include one or more processors (602), non-persistent storage (604), persistent storage (606), an output device (608), an input device (610), and a communication interface (612). Each of these components is described below.

In one or more embodiments, the processor(s) (602) may be an integrated circuit for processing instructions. For example, the processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., Internet, mobile network, etc.) and/or to another device, such as another computing device.

In one or more embodiments, the computing device (600) may include one or more output devices (608), such as a screen (e.g., a liquid crystal display (LCD), plasma display, touchscreen, or other display device), a printer, external storage, or any other output device. One or more of the output devices may be the same or different from the input device(s). The input and output device(s) may be locally or remotely connected to the computer processor(s) (602), non-persistent storage (604), and persistent storage (606).

Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for compiling a software package, the method comprising:

receiving a request to compile the software package from a client device;

making, in response to the request a first determination that the software package is in a release candidate phase;

identifying a first artifact and a second artifact associated with the software package;

associating a threshold value with the first artifact and the second artifact based on the first determination;

receiving, for the first artifact a first build test result history comprising a first plurality of test results for the first artifact and a first plurality of separate versions of the first artifact, and wherein each of the first plurality of test results is associated with a separate one of the first plurality of separate versions of the first artifact;

receiving, for the second artifact a second build test result history comprising a second plurality of test results for the second artifact and a second plurality of separate versions of the second artifact, and wherein each of the second plurality of test results is associated with a separate one of the second plurality of separate versions of the second artifact;

making a second determination that at least one first test result from the first plurality of test results is above the threshold value;

making a third determination that at least one second test result from the second plurality of test results is above the threshold value;

determining, by applying a collaborative filter to the first plurality of test results and the second plurality of test results, a first promotion score for each of the first plurality of separate versions and a second promotion score for each of the second plurality of separate versions, wherein the collaborative filter clusters the first plurality of test results and the second plurality of test results according to test failures and test passes using a K-means clustering technique;

identifying, for the first artifact, a first artifact version associated with a highest first promotion score of the first promotion scores;

identifying, for the second artifact, a second artifact version associated with a highest second promotion score of the second promotion scores;

generating a recommended software package comprising the first artifact version of the first artifact and the second artifact version of the second artifact;

compiling the recommended software package to obtain a compiled software package, wherein the compiling comprises:

checking dependencies among the first artifact version and the second artifact version;

linking the first artifact version and the second artifact version;

loading the first artifact version and the second artifact version into a functional binary; and running automated unit tests on the compiled software package; and sending the compiled software package to the client device.

2. The method of claim 1, wherein the first artifact is an individual artifact and the second artifact is a package of multiple individual artifacts.

3. The method of claim 1, wherein the first artifact is a first individual artifact and the second artifact is a second individual artifact.

4. The method of claim 1, wherein the first artifact is a first package of multiple individual artifacts and the second artifact is a second package of multiple individual artifacts.

5. The method of claim 1, wherein both the first build test result history and the second build test history are based on a combination of automated tests and ratings from users.

6. The method of claim 1, wherein each of the first plurality of separate versions are greater than a minimum version number.

7. The method of claim 1, wherein the first plurality of test results is based on a combination of a security test a code churn test a defect test, and a feature test.

8. A method for compiling a software package, the method comprising:

receiving a request to compile the software package from a client device;

identifying, in response to the request a first artifact and a second artifact associated with the software package;

receiving, for the first artifact a first build test result history comprising a first plurality of test results for the first artifact and a first plurality of separate versions of the first artifact, and wherein each of the first plurality of test results is associated with a separate one of the first plurality of separate versions of the first artifact;

receiving, for the second artifact a second build test result history comprising a second plurality of test results for the second artifact and a second plurality of separate versions of the second artifact, and wherein each of the second plurality of test results is associated with a separate one of the second plurality of separate versions of the second artifact;

determining, by applying a collaborative filter to the first plurality of test results and the second plurality of test results, a first promotion score for each of the first plurality of separate versions and a second promotion score for each of the second plurality of separate versions, wherein the collaborative filter clusters the first plurality of test results and the second plurality of test results according to test failures and test passes using a K-means clustering technique;

identifying, for the first artifact, a first artifact version associated with a highest first promotion score of the first promotion scores;

identifying, for the second artifact, a second artifact version associated with a highest second promotion score of the second promotion scores;

generating a recommended software package comprising the first artifact version of the first artifact and the second artifact version of the second artifact;

compiling the recommended software package to obtain a compiled software package, wherein the compiling comprises:

checking dependencies among the first artifact version and the second artifact version;

linking the first artifact version and the second artifact version;

loading the first artifact version and the second artifact version into a functional binary; and running automated unit tests on the compiled software package; and sending the compiled software package to the client device.

9. The method of claim 8, wherein the first artifact is an individual artifact and the second artifact is a package of multiple individual artifacts.

10. The method of claim 8, wherein the first artifact is a first individual artifact and the second artifact is a second individual artifact.

11. The method of claim 8, wherein the first artifact is a first package of multiple individual artifacts and the second artifact is a second package of multiple individual artifacts.

12. The method of claim 8, wherein both the first build test result history and the second build test history are based on a combination of automated tests and ratings from users.

13. The method of claim 8, wherein each of the first plurality of separate versions are greater than a minimum version number.

14. The method of claim 8, wherein the first plurality of test results is based on a combination of a security test a code churn test a defect test, and a feature test.

15. A non-transitory computer readable medium comprising computer readable program code, which when executed by a computer processor enables the computer processor to perform a method for compiling a software package, the method comprising:

receiving a request to compile the software package from a client device;

identifying, in response to the request a first artifact and a second artifact associated with the software package;

receiving, for the first artifact a first build test result history comprising a first plurality of test results for the first artifact and a first plurality of separate versions of the first artifact, and wherein each of the first plurality of test results is associated with a separate one of the first plurality of separate versions of the first artifact;

receiving, for the second artifact a second build test result history comprising a second plurality of test results for the second artifact and a second plurality of separate versions of the second artifact, and wherein each of the second plurality of test results is associated with a separate one of the second plurality of separate versions of the second artifact;

determining, by applying a collaborative filter to the first plurality of test results and the second plurality of test results, a first promotion score for each of the first plurality of separate versions and a second promotion score for each of the second plurality of separate versions, wherein the collaborative filter clusters the first plurality of test results and the second plurality of test results according to test failures and test passes using a K-means clustering technique;

identifying, for the first artifact, a first artifact version associated with a highest first promotion score of the first promotion scores;

identifying, for the second artifact, a second artifact version associated with a highest second promotion score of the second promotion scores;

generating a recommended software package comprising the first artifact version of the first artifact and the second artifact version of the second artifact;

compiling the recommended software package to obtain a compiled software package, wherein the compiling comprises:

checking dependencies among the first artifact version and the second artifact version;

linking the first artifact version and the second artifact version;

loading the first artifact version and the second artifact version into a functional binary; and running automated unit tests on the compiled software package; and sending the compiled software package to the client device.

16. The non-transitory computer readable medium of claim 15, wherein the first artifact is an individual artifact and the second artifact is a package of multiple individual artifacts.

17. The non-transitory computer readable medium of claim 15, wherein the first artifact is a first package of multiple individual artifacts and the second artifact is a second package of multiple individual artifacts.

18. The non-transitory computer readable medium of claim 15, wherein both the first build test result history and the second build test history are based on a combination of automated tests and ratings from users.

19. The non-transitory computer readable medium of claim 15, wherein each of the first plurality of separate versions are greater than a minimum version number.

20. The non-transitory computer readable medium of claim 15, wherein the first plurality of test results is based on a combination of a security test a code churn test a defect test, and a feature test.

* * * * *